(12) United States Patent
Cox

(10) Patent No.: US 7,728,727 B2
(45) Date of Patent: Jun. 1, 2010

(54) DYNAMIC INVENTORY DURING TRANSIT

(75) Inventor: Paul A Cox, Albuquerque, NM (US)

(73) Assignee: Honeywell International Inc., Morristown, NJ (US)

(*) Notice: Subject to any disclaimer, the term of this patent is extended or adjusted under 35 U.S.C. 154(b) by 482 days.

(21) Appl. No.: 11/381,808

(22) Filed: May 5, 2006

(65) Prior Publication Data

US 2006/0255916 A1 Nov. 16, 2006

Related U.S. Application Data

(60) Provisional application No. 60/679,446, filed on May 10, 2005.

(51) Int. Cl.
*G08B 13/14* (2006.01)

(52) U.S. Cl. .................................. 340/572.1

(58) Field of Classification Search ... 340/572.1–572.9, 340/10.1, 5.92; 701/1
See application file for complete search history.

(56) References Cited

U.S. PATENT DOCUMENTS

| | | | |
|---|---|---|---|
| 5,774,876 A * | 6/1998 | Woolley et al. | 705/28 |
| 6,195,006 B1 | 2/2001 | Bowers et al. | 340/572.1 |
| 6,236,911 B1 * | 5/2001 | Kruger | 701/1 |
| 6,601,764 B1 | 8/2003 | Goodwin, III | |
| 6,693,539 B2 | 2/2004 | Bowers et al. | 340/572.1 |
| 6,919,803 B2 * | 7/2005 | Breed | 340/539.14 |
| 6,973,385 B2 * | 12/2005 | Ulrich | 701/207 |
| 7,173,530 B2 * | 2/2007 | Lambright et al. | 340/572.8 |
| 7,259,669 B2 * | 8/2007 | Cargonja et al. | 340/539.18 |
| 2006/0187043 A1 * | 8/2006 | Allen | 340/572.1 |

OTHER PUBLICATIONS

Gallagher, "Aerospace RFID", "Avionics Magazine", Apr. 2008, pp. 38-42.

* cited by examiner

*Primary Examiner*—Phung Nguyen
(74) *Attorney, Agent, or Firm*—Fogg & Powers LLC

(57) ABSTRACT

A method of dynamically keeping inventory of items in a vehicle in transit is provided. The method includes detecting an event during transit and conducting interrogations of inventory based on the detected event. The method can compare these inventories to determine disposition of inventory items by location.

14 Claims, 4 Drawing Sheets

DYNAMIC INVENTORY DURING TRANSIT

RELATED APPLICATIONS

This application claims the benefit of prior provisional application 60/679,446, filed May 10, 2005, which is incorporated in its entirety herein by reference.

BACKGROUND

Current inventory tracking systems track inventory of items being shipped by first checking the inventory at the shipping origination location and then at the receiving location. These inventories can then be compared to determine if something was lost in transit. One method used to simplify the taking of inventory is with the use identification tags such as electronic identification tags. An example of an electronic identification tag is passive or active radio frequency identification (RFID) tags. With this system each item, or group of items, has an RFID tag attached that contains information that identifies the item, or group of items. A sensor or reader at a known location simply reads the information off of the RFID tag when the item is passed through a detector/reader or passes within the vicinity of a reader.

One limitation of this system is that not all shipping locations and receiving location have detectors/readers to read the identification tags. Another limitation of the current system is that inventory can not be inventoried during transit, unless readers are present on the transportation vehicle. These vehicles equipped with readers can only report if the item is currently present on the vehicle, but can not provide insight in to the location of the inventoried item. Hence, events that occur during transit that effect the inventory cannot be monitored.

For the reasons stated above and for other reasons stated below which will become apparent to those skilled in the art upon reading and understanding the present specification, there is a need in the art for an efficient, automated method of inventorying items during transit on vehicles.

SUMMARY OF INVENTION

The above-mentioned problems of current systems are addressed by embodiments of the present invention and will be understood by reading and studying the following specification.

In one embodiment, a method of dynamically keeping inventory of items in a vehicle in transit is provided. The method includes detecting an event during transit and conducting a first interrogation of inventory based on the detected event.

In another embodiment, a computer-readable medium having computer-executable instructions for tracking inventory in a transport vehicle is provided. The computer-readable medium includes the methods of initiating interrogations of items in a vehicle in transit in response to the detection of one or more events and generating a manifest of the inventory based on each interrogation.

In still another embodiment an inventory tracking system is provided. The inventory tracking device includes an interrogation device and a control unit. The interrogation device is located in a transit vehicle and is adapted to read identification tags on items being transported. The control unit is adapted to control the interrogation device in response to an event.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
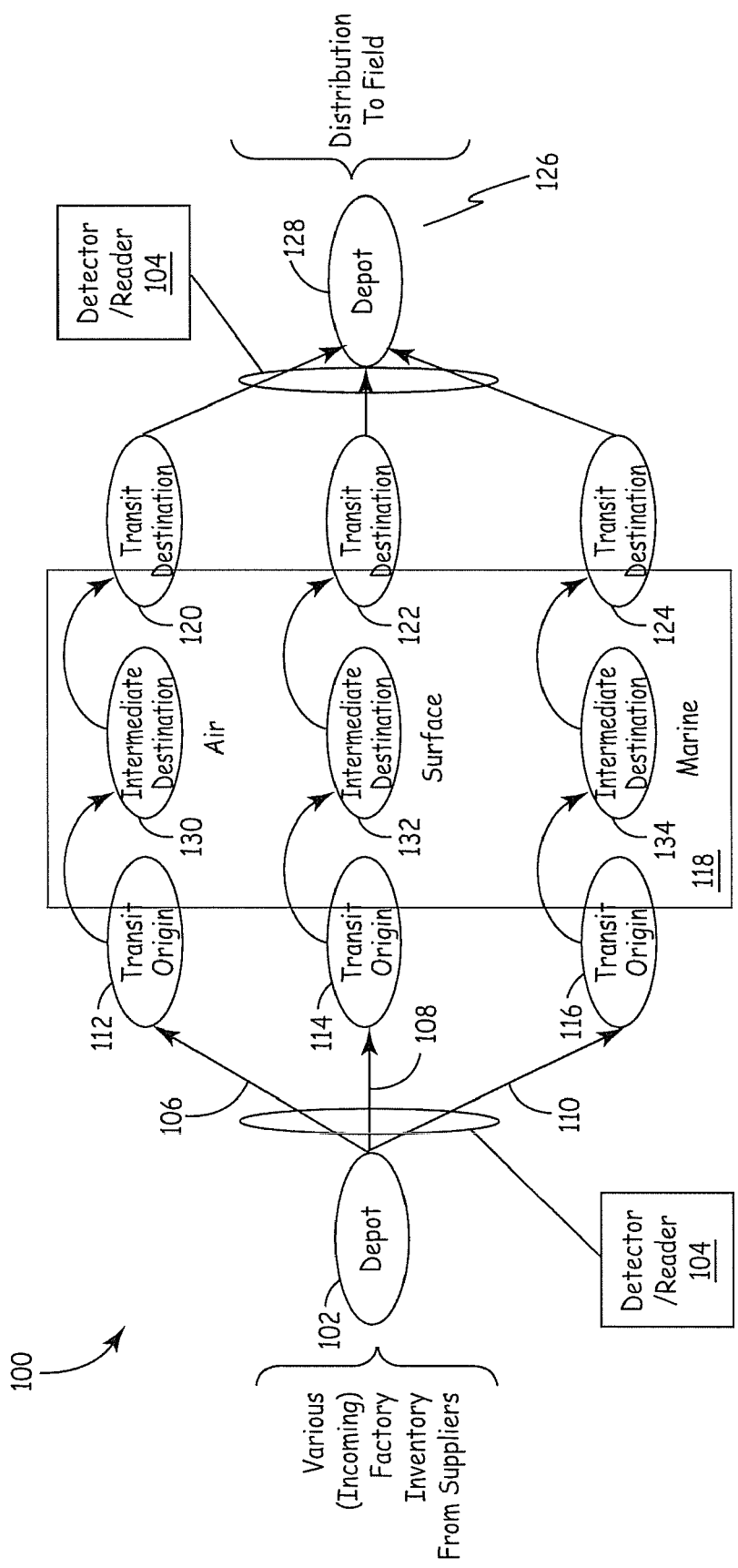
FIG. 1 is a flow diagram illustrating one embodiment of the present invention.

Embodiments of the present invention provide an efficient and effective method of tracking inventories while in transit. In embodiments, of the invention, interrogations of the inventory are conducted based on detected events. Manifests of the inventory are created based on the each interrogation. In one embodiment, a control unit that initiates an interrogation in a transport vehicle interfaces with on-board vehicle systems to monitor data used to determine the interrogation event and provide position (latitude and longitude) of the inventory to a remote unit. Referring to FIG. 1, a flow diagram of a transit system 100 of one embodiment of the present invention is illustrated. As illustrated, various factory parts from suppliers for transit are provided to depot 102. In this example, three types of transportation are provided, air, surface and marine. Path 106 is associated with the air transportation, path 108 is associated with the surface transportation and path 110 is associated with the marine transportation. Within the depot 102, the items to be transported are typically passed through, or are located near, a detector/reader 104. The detector/reader 104 is an interrogation system adapted to read electronic identification tags associated with each item to be transported. An example of an electronic identification tag is a passive or active RFID tag. Once the items have been passed through the detector/reader 104 they are placed in their respective vehicle for transit. Once the items are loaded, the items are at their respective transit origin 112, 114 or 116.

The items are then transported using their respective vehicle. This is the transit period 1 1 8. In prior art method, once the items where on there respective vehicle for transit, there was no way to monitor the inventory until they where unloaded at a drop off sight that had a detector/reader adapted to read the inventory. As discussed above, that type of system is limited. In embodiments of the present invention an effective and efficient method of tracking the inventory while the inventory is in transit is provided. In embodiments of the present invention, the vehicle transporting the items includes an interrogation system. The interrogation system is adapted to conduct an inventory of the items contained in the vehicle upon an event. In one embodiment, the event is a vehicle specific parameter such as when the vehicle reaches a select speed, altitude or when a door is opened or when a door is closed. In another embodiment, the event is an inventory signal that is generated from an operator of the vehicle or from a remote location such as an operation, maintenance, or logistic center. In further embodiments of the present invention, a delta manifest is created that tracks differences in inventories after each interrogation.

Referring back to FIG. 1, when the inventory reaches an intermediate destination 130, 132 or 134, portions of the inventory may be removed and/or added to the transportation vehicle. In one embodiment the only detector/readers are located on the vehicle. Hence only items added to, or remaining on, the transportation vehicle can be inventoried. The inventory manifest is associated with the location (latitude and longitude) at which the inventory was obtained.

Referring back to FIG. 1, when the inventory reaches its destination, it is at its respective transit destination 120, 122 or 124. The items are then pasted through, or near, detector/reader 126 so the inventory can be checked and then placed at depot 128 for further distribution. In some embodiments of the present invention, the need for detector/reader 104 and detector/reader 126 is eliminated since the inventory is dynamically checked throughout the transportation. In other embodiments, the detectors/readers 104 and 126 are used to verify results.

Figure 2:
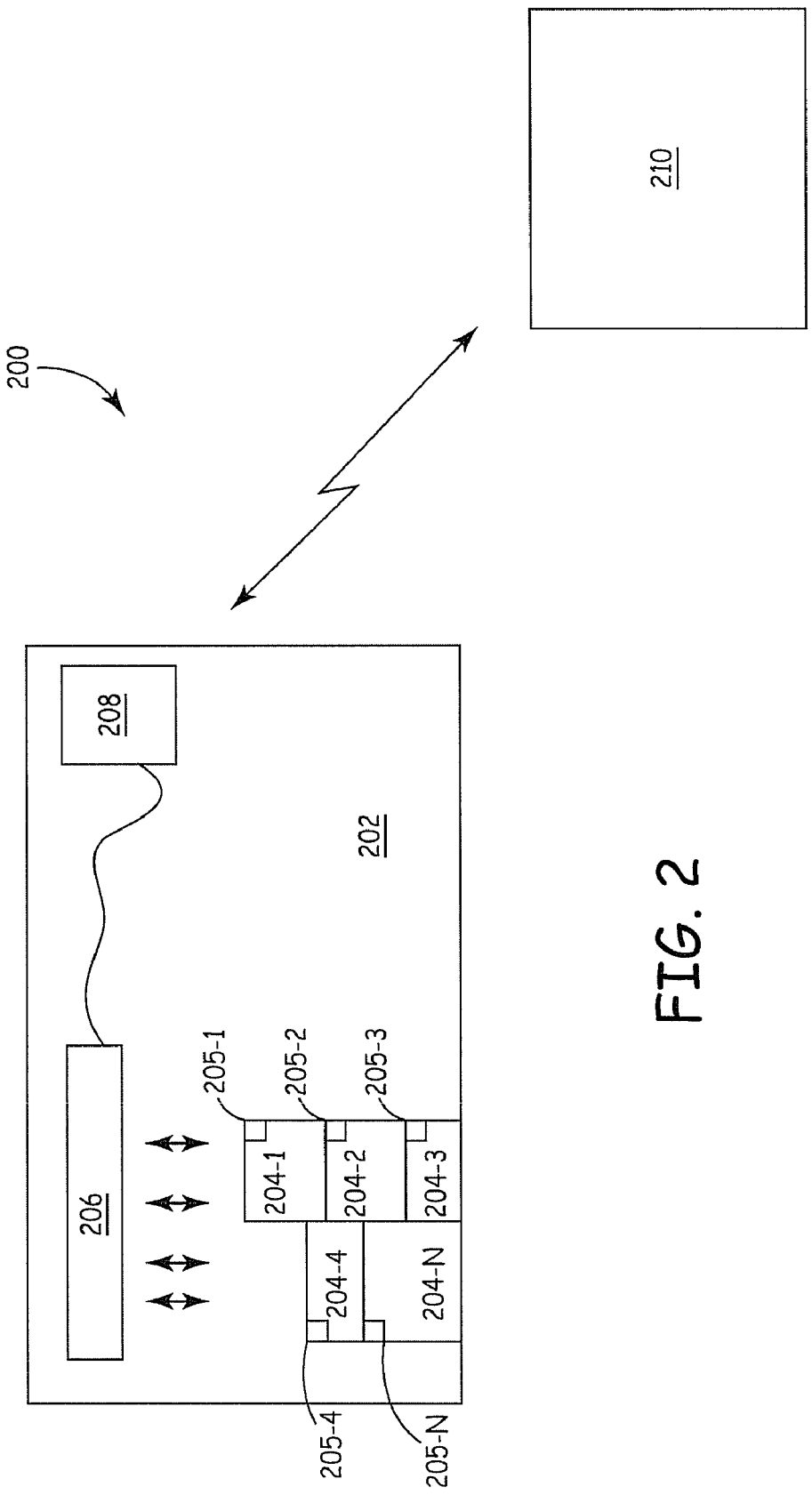
FIG. 2, is a block diagram of a dynamic inventory system of one embodiment of the present invention.

FIG. 2 illustrates a dynamic inventory system 200 of one embodiment of the present invention. This embodiment includes a transport vehicle 202 such a plane, truck or ship. The transport vehicle 202 is transporting items 204-1 through 204-N. The transport vehicle also includes an interrogation system 206. The interrogation system is adapted to read identification tags, such as identification tags 205-1 through 205-N, that are associated with each item in conducting an inventory of the items 204 in the transport vehicle 202. In one embodiment, the identification tags are electronic identification tags such as RFID passive or active tags. The interrogation system is coupled to control unit 208. Control unit 208 is adapted to control the interrogation system 206. In one embodiment, the control unit 208 is adapted to initiate an inventory upon the detection of an event associated with the transport vehicle 202. For example, the event could be when the vehicle reaches a certain speed, when a select location (latitude/longitude) is passed, when a select altitude is reached, after a certain time has passed, etc. In another embodiment, an operator in the transport vehicle, or near the transit vehicle, can direct the control unit 208 to initiate an inventory upon command. In yet another embodiment, the event is a signal received from a remote control station 210 via wireless communication link 212. In this embodiment, a distribution center or the like can direct the control unit 208 to initiate an inventory. Further in another embodiment, the control unit 208 is adapted to send the results of inventory, or delta inventory, to the remote control station 210.

Figure 3:
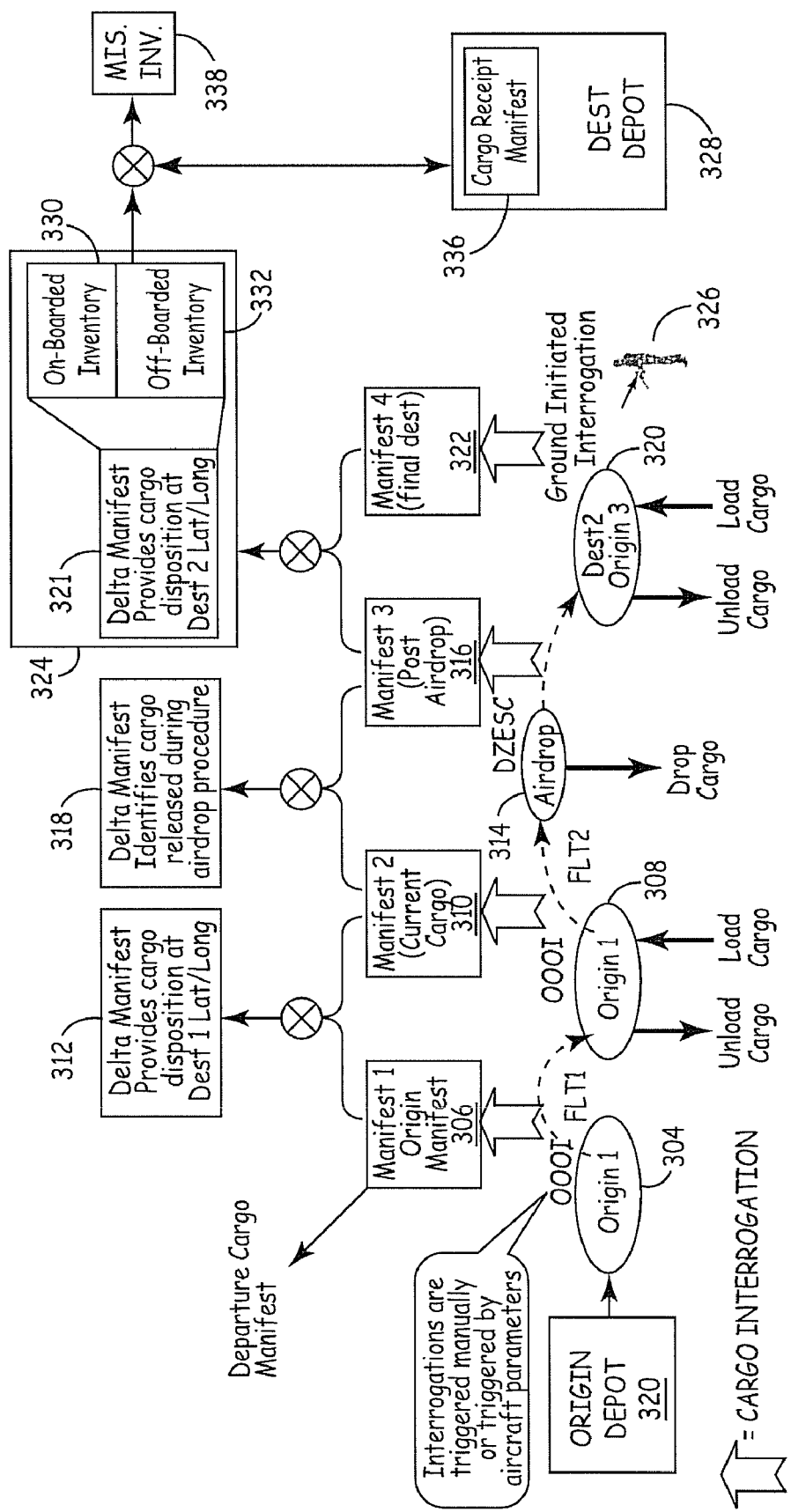
FIG. 3 is a flow diagram of another embodiment of the present invention.

Referring to FIG. 3, a flow diagram 300 of another embodiment of the present invention is illustrated. As illustrated, items at an origin depot 320 are loaded into an aircraft at origin 304. Once the aircraft has taken to flight, a first manifest is created 306 by taking inventory of the cargo (items) with an inboard interrogation. The interrogation is directed either manually or triggered by aircraft parameters such as, aircraft speed, position (latitude/longitude), weight on wheels (WOW), drop zone (DZ), altitude, proximity sensors such as door closures out, off, on, in (OOOI) parameters, or triggered remotely through vehicles equipage sending messages to control unit 208. In this example, the aircraft then reaches a first destination 308. At this first destination 308, cargo is unloaded and loaded. Once the aircraft unloading /loading is complete, or the aircraft has taken off from the first destination 308, an interrogation is conducted and a second manifest 310 is created. In response to this second manifest 310, a delta manifest 312 is created that compares the first manifest 306 with the second manifest 310 to determine what was loaded and unload at the first destination 308. Further in this embodiment, an airdrop 314 location is provided by on-board vehicle system is encountered. After the airdrop 314, an interrogation is taken and a third manifest is created 316 that contains the current inventory. Another delta manifest 318 is then created that compares the third manifest 316 from the second manifest 310 to determine what was unloaded at the airdrop. Hence disposition of inventory at a specific location is determined.

The aircraft then reaches the second destination 320 upon which cargo is unloaded and loaded. Upon completion of unloading/loading another interrogation is conducted. In one embodiment this interrogation can be initiated once the aircraft returns to flight. In another embodiment the interrogation is initiated by ground-based personnel 326 with a remote trigger device. A fourth manifest is then created 322 based on the interrogation that contains the then current inventory of the cargo. In this example, the forth manifest is compared with the second manifest 310 or the third manifest 316 to create delta manifest 324. This illustrates the flexibility of creating delta manifests.

Delta Manifest 324 consists of two components, items off-loaded 332 from the vehicle, and items on-loaded 330 to the vehicle. The off-loaded items can then be compared to an expected cargo receipt manifest 336 present at the destination depot 328. In one embodiment a missing inventory manifest 338 is created to capture which inventory items where not correct loaded/loaded.

Figure 4:
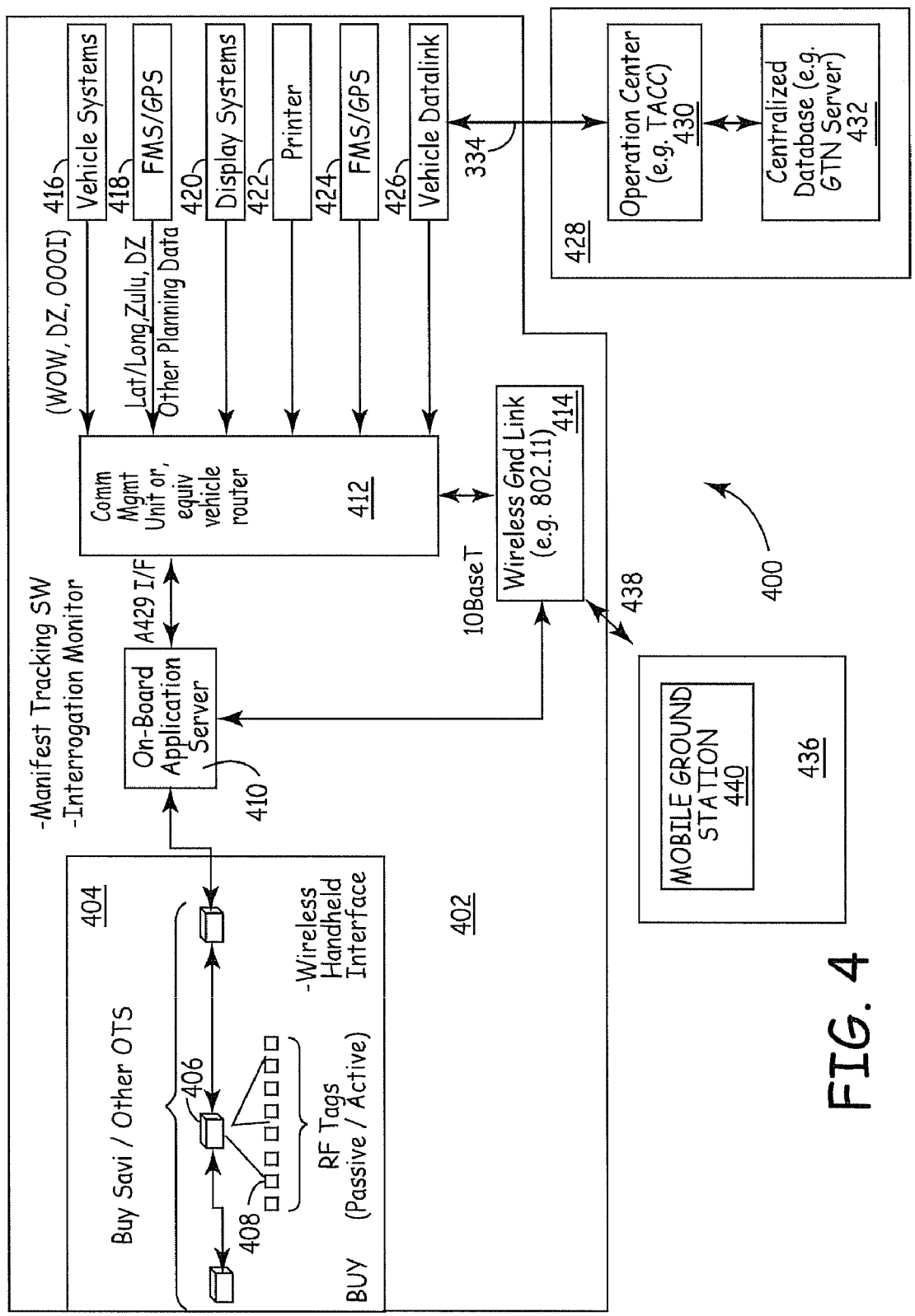
FIG. 4 is a block diagram of an inventory system of one embodiment of the present invention.

Another embodiment of an inventory system 400 the present invention is illustrated in FIG. 4. This embodiment includes a vehicle 402 and a remote operating location 428. The vehicle 402 includes an inventory determining system 404. The inventory determining system 404 includes one or more interrogation devices 406 which are adapted to read identification tags 408 on items. Also illustrated is an on-board application server 410. The on-board application server 410 is adapted to control the interrogation device 406. A communication management unit 412 is coupled to the on-board application server 410. In one embodiment, the on-board application server 410 is in communication with the communication management unit 412 via wireless link 414, or other electronic communication link such as ARINC 429, Mil-std-1553, Ethernet, fiber-optic, etc.

The communication management unit 412, or equivalent data router, is adapted to interface communications between the on-board application server 410 and data sharing systems. The data sharing systems include vehicle system 416, FMS/GPS/Navigation 418, display system 420, printer 422, Electronic Flight Bag (or equivalent) 424, and a vehicle data link 426. The vehicle system 416 provides vehicle parameters such as WOW, DZ, OOOI and speed. The FMS/GPS 418 provide latitude, longitude, time, drop zone and other flight planning data. The display system 420 allows for the display of inventories determined by interrogations. The printer 422 provides a hard copy of inventories. The vehicle data link 426 provides two-way data link communications to an off-vehicle, or remote operating center.

A remote operating location 428 is also illustrated which allows for the remote operation of the inventory determining system 404 of the vehicle 402. The remote operating location 428 includes an operating center 430 and a centralized database 432. An example of an operating center 430 is the Military's Tanker Airlift Control Center (TACC), or commercial Airline Operations Control (AOC) Centers. The operating center is in communication with the vehicle datalink 426. Examples of the communication medium 334 used include but are not limited to INMARSAT Satcom, VHF, HF, UHFDL, Iridum Satcom, Ku/Ka-Band Satcom, and telephony datalinks. Additionally the Aircraft system 402 may communicate with ground operators 436 mobile devices 440 via two-way datalink system 438. Examples of ground-based datalink systems include but are not limited to wireless standards such as 802.11, 802.16, and Zigbee, and operate in a multitude of radio frequency ranges.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of dynamically keeping inventory of items in a vehicle in transit the method comprising:
   detecting an event during transit; wherein the event is a signal that is transmitted remote from the vehicle;
   conducting a first interrogation of inventory based on the detected signal that is transmitted remote from the vehicle;
   creating a first manifest of items based on the first interrogation;
   conducting a second interrogation after the detection of a second event;
   creating a second manifest of items based on the second interrogation; and
   creating a delta manifest by comparing the first manifest to the second manifest to determine a change inventory that indicates changes between the first and second manifests;
   wherein vehicle position is associated with the first, second and delta manifests.

2. The method of claim 1, wherein conducting the first interrogation further comprises:
   reading identification tags on each item in the vehicle.

3. The method of claim 1, further comprising:
   conducting an additional interrogation of inventory based on detecting an operating parameter of the vehicle.

4. The method of claim 3, wherein the operating parameter includes at least one of vehicle's local or zulu time, altitude, position (latitude/longitude), time in transit, proximity sensors/switch state change, cargo drop zone waypoint, navigation waypoints, throttle position, brake release, weight-on/off-wheels, or manual crew/operator initiation.

5. The method of claim 1, wherein the second event is an airdrop event.

6. A computer-readable medium having computer-executable instructions for tracking inventory in a transport vehicle, the computer-readable medium including methods comprising:
   initiating interrogations of items in a vehicle in transit in response to signals that are transmitted remote from the vehicle;
   generating a plurality of manifests of inventory, each manifest of the inventory based on a respective interrogation; and
   generating one or more delta manifests based on a comparison of two or more of the plurality of manifests, wherein vehicle position is associated with the plurality of manifests and the one or more delta manifests.

7. The computer-readable medium method of claim 6, wherein each of the one or more delta manifest comprises at least one of items removed from vehicle and items added to vehicle.

8. The computer-readable medium method of claim 6, further comprising initiating additional interrogations based on the detection of a select parameter associated with the transport vehicle.

9. The computer readable medium of claim 8, wherein the select parameter associated with the transport vehicle includes at least one of vehicle's local or zulu time, altitude, position (latitude/longitude), time in transit, proximity sensors/switch state change, cargo drop zone waypoint, navigation waypoints, throttle position, brake release, weight-on/off-wheels, or manual crew/operator initiation.

10. The computer-readable medium method of claim 6, further comprising:
    tagging each generated manifest with time and location information.

11. An inventory tracking system comprising:
    an interrogation device located in a transit vehicle configured to read identification tags on items being transported; and
    a control unit configured to control the interrogation device in response to signals sent remote from the transit vehicle directing the control unit to control the interrogation device to conduct an interrogation;
    wherein the control unit is further configured to:
      create a first manifest of items based on a first interrogation;
      conduct a second interrogation after the detection of a second event;
      create a second manifest of items based on the second interrogation; and
      create a delta manifest by comparing the first manifest to the second manifest to determine a change inventory that indicates changes between the first and second manifests;
      wherein vehicle position is associated with the first, second and delta manifests.

12. The inventory tracking device of claim 11, wherein the control unit is adapted to detect a parameter associated with the transit vehicle.

13. The inventory tracking device of claim 11, the control unit further configured to control the interrogation device in response to an event, wherein the event is at least one of vehicle's local or zulu time, altitude, position (latitude/longitude), time in transit, proximity sensors/switch state change, cargo drop zone waypoint, navigation waypoints, throttle position, brake release, weight-on/off-wheels, or manual crew/operator initiation.

14. The inventory tracking device of claim 11, further comprising at least one of a wireless ground link, data sharing systems, a wireless airborne link and a wireless marine link.

* * * * *